United States Patent [19]

Fettes

[11] Patent Number: 4,595,230
[45] Date of Patent: Jun. 17, 1986

[54] METHOD AND APPARATUS FOR CONVERTING A HARDTOP VEHICLE TO A REMOVABLE TOP VEHICLE

[75] Inventor: Barry A. Russell, Beverly Hills; Ian Ian J. Fettes, Newport Beach, of Calif.

[73] Assignee: Top Off Corp., Newport Beach, Calif.

[21] Appl. No.: 502,940

[22] Filed: Jun. 10, 1983

[51] Int. Cl.[4] .............................................. B60J 7/195
[52] U.S. Cl. .................................. 296/102; 296/210; 296/216; 296/224; 29/401.1; 49/482
[58] Field of Search .............. 29/401.1; 296/102, 103, 296/107, 185, 186, 210, 216, 218, 219, 224; 49/482, 483

[56] References Cited

U.S. PATENT DOCUMENTS

| 1,621,404 | 3/1927 | Harvey | 296/218 |
|---|---|---|---|
| 2,382,635 | 8/1945 | Humer | 296/107 |
| 2,511,460 | 6/1950 | Cancelli et al. | 296/216 |
| 2,596,309 | 5/1952 | Urich | 296/102 |
| 3,237,983 | 3/1966 | Hollar, Jr. | 296/107 |
| 3,603,636 | 9/1971 | Carella et al. | 296/218 |
| 3,610,681 | 10/1971 | Trenkler | 296/218 |
| 3,738,670 | 6/1973 | Jelinek et al. | 49/482 |
| 4,238,876 | 12/1980 | Monroe et al. | 296/224 |
| 4,252,365 | 2/1981 | Ferguson | 296/216 |
| 4,290,640 | 9/1981 | Dalton | 296/216 |

FOREIGN PATENT DOCUMENTS

| 19071 | 3/1956 | Fed. Rep. of Germany | 296/216 |
|---|---|---|---|
| 2929915 | 2/1981 | Fed. Rep. of Germany | 296/218 |
| 3024619 | 1/1982 | Fed. Rep. of Germany | 296/218 |
| 6513402 | 4/1966 | Netherlands | 296/210 |

Primary Examiner—Robert B. Reeves
Assistant Examiner—Dennis H. Pedder
Attorney, Agent, or Firm—Roberts and Quiogue

[57] ABSTRACT

A novel apparatus and method for the conversion of the hardtop vehicles to removable top vehicles is disclosed. The conversion includes the severing of a portion of the hardtop and the attachment of a roof cap member to the removable top. The cap includes a cantilevered forward section adapted to seal and conceal the juncture of the top leading edge and vehicle header. A roof stiffener secures the leading edge of the severed roof top to the roof cap. Novel transition seal pairs and an elongated header seal are provided to seal the juncture of the vehicle header and the leading edge of the removable roof. Mating upper and lower caps are secured to the rear severed edges of the vehicle and hardtop. Latches are provided to secure the hardtop in position and are adapted to include positioning adjustments to properly fit the hardtop to the vehicles.

Other features and improvements are disclosed.

37 Claims, 12 Drawing Figures

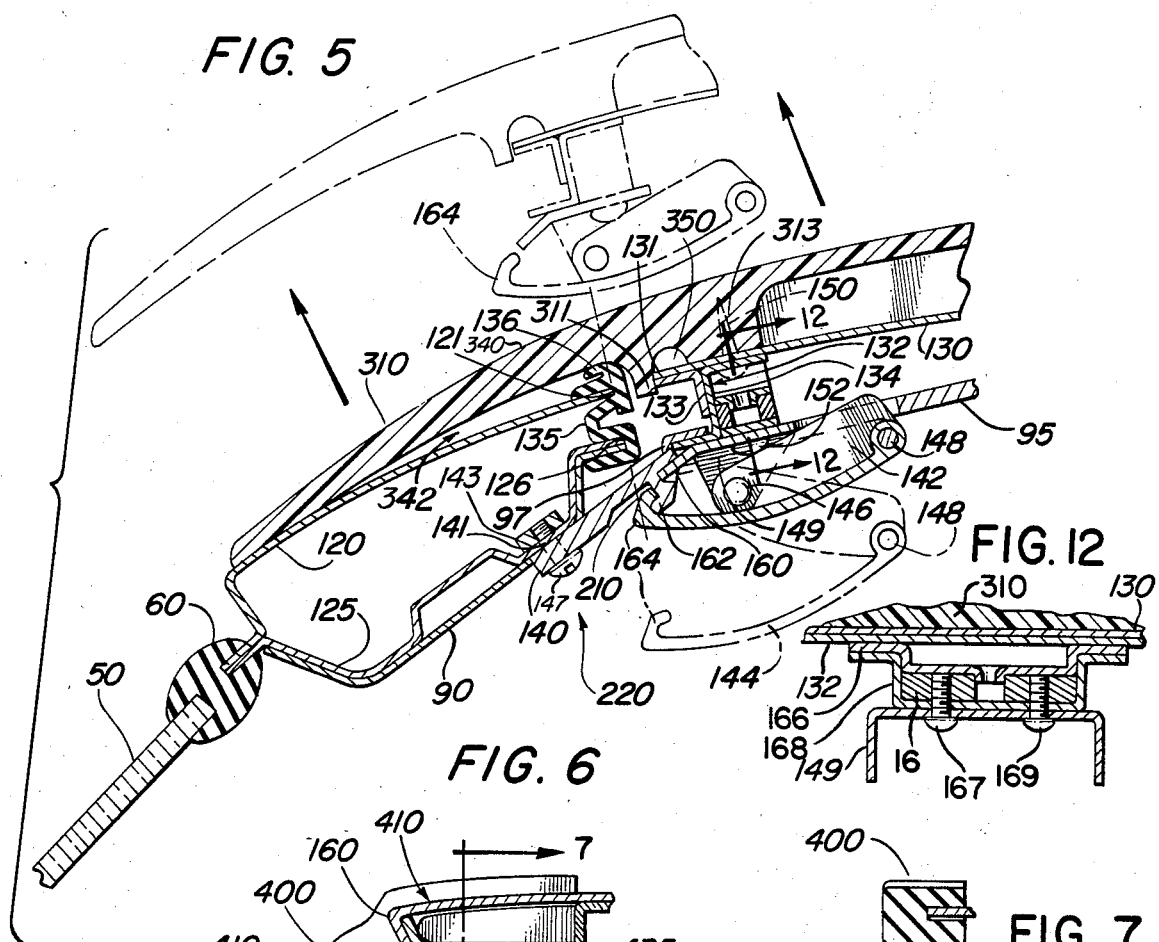

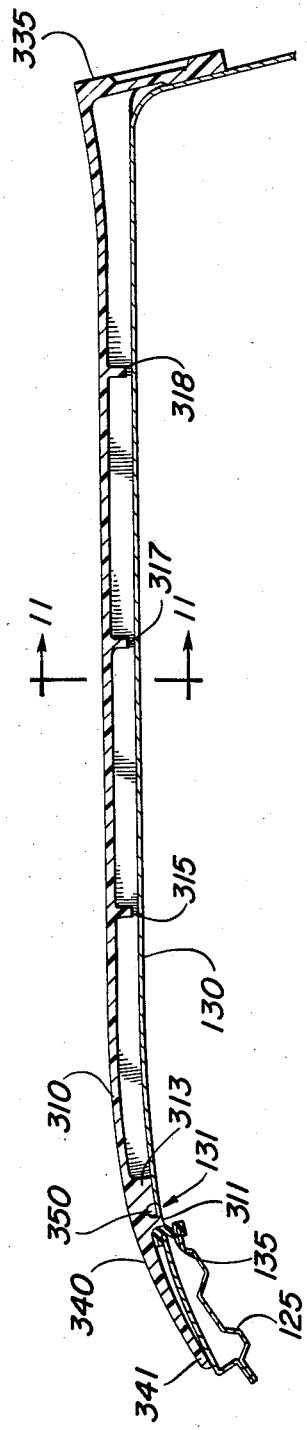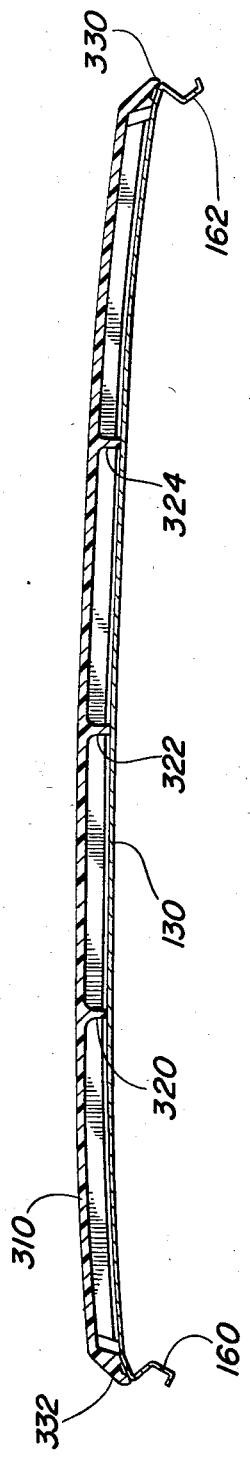

METHOD AND APPARATUS FOR CONVERTING A HARDTOP VEHICLE TO A REMOVABLE TOP VEHICLE

BACKGROUND OF THE INVENTION

1. Field of the Invention

The present invention relates to the vehicle customizing field, and more particularly to the conversion of hardtop vehicles to removable top vehicles.

2. Description of the Prior Art

Since soft-top convertibles went out of production in the United States in the mid-1970's, there has been a trend in the automotive and recreational sport pickup truck field to removable hardtop vehicles. Even today when the major automotive manufacturers have started production of convertibles again, there remains a demand for convertible vehicles. U.S. Pat. No. 4,238,876 discloses a method for converting hardtop vehicles to removable top vehicles. The method described in this patent employs scribing molds and special sealing gaskets tailored to a vehicle model for converting the hardtop vehicle into a removable top vehicle. The scribing molds are formed to match the contour of the body of the truck at preselected locations, and are used to precisely locate cutting lines. Once the cutting lines are scribed along the edges of the molds, incisions are made and the cab top removed. When the trimming is completed, all cavities in the top and body exposed as a result of the cutting are filled with a filler foam. A bonding agent is applied to surfaces of the gaskets which will contact the top or the cab and the gaskets are then secured to the severed sections of the top and cab. The top is then positioned on the cab and appropriate positional adjustments made to the inserted gaskets. Latches are provided to latch the top in position.

While the method described in the above-referenced patent has utility, it does suffer several disadvantages. For example, the method appears to be susceptible for use particularly with double-walled vehicles, and it would be difficult to adapt the method to a vehicle having a single-walled roof. Securing the latches to a single wall would result in unsightly bolts, mounting plates or fasteners protruding from the roof line, as well as the loss of structural strength. Moreover, the removable top resulting from the disclosed method appears prone to water leakage from standing water. The sealing results from the meeting of the opposing faces of molded seals on each side of the severed roof sections, and the mating of a lip section of one seal into a channel formed in the opposing seal. For this sealing to be effective, the top and cab section must be fitted together quite accurately and some time consuming custom fitting appears inevitable. A further problem associated with the method of this patent is that it results in a removable top of reduced aerodynamic efficiency, in that the seals apparently protrude from the roof line to some extent.

It is, therefore, an object of the present invention to provide a method and apparatus for converting a hardtop vehicle having a single-wall roof into a removable top vehicle.

It is yet another object of the present invention to convert the hardtop vehicle into a removable top vehicle in such a manner that the aerodynamic efficiency of the hardtop vehicle is substantially retained.

It is a further object of the present invention to provide apparatus and method for conversion of hardtop vehicles into removable top vehicles which results in effective water sealing against entrance of water either under dynamic pressure when the vehicle is under way or under static pressure as with standing water.

It is yet another object of the present invention to provide a method for conversion which does not require an undue amount of custom grinding and fitting of the removed top and the vehicle body.

It is still a further object of the present invention to provide a conversion method and apparatus which is amenable to efficient installation techniques.

SUMMARY OF THE INVENTION

These and other objects and advantages are obtained from the method and apparatus described in the following description and appended drawings. The present invention comprises an apparatus and method for converting hardtop vehicles to removable top vehicles. The technique involves severing the vehicle roof along a line adjacent and paralleling the top of the windshield and also along the line below the rear window of the vehicle cab. The severed top is then removed. A novel header seal comprising an EPDM extrusion is bonded to the edge of the roof header and a pair of molded EPDM transition pieces are fitted to the sides of the severed header edges abutting the door windows. A second pair of transition pieces are fitted to the front side corners of the removed roof to engage respective ones of the first seal pair when the roof is in position. A stiffening brace is attached to the leading edge of the severed roof. A cantilevered roof cap is fitted to the removed vehicle top having a forward section extending over the roof header portion of the vehicle when the top is in position. The forward section of the cap abutts against the seal and fits against the cab header top surface adjacent the windshield seal so as to present an aerodynamically clean leading edge. The interior of the removable roof is fitted with over-center latch members arranged to engage complimentary latch members fastened to the cab header to fasten the roof in place.

The rear portion of the vehicle cab is fitted along its severed edge with a first molded cap provided with an upwardly extending ridge. A second molded cap fits over the rearward severed edge of the vehicle top and is formed with a channel. The ridge of the first cap is received in the channel of the second cap to laterally fix the top in position. A seal is provided to prevent entrance of moisture into the cab interior and a pair of latches secures the rear of the removable cab against vertical movement.

The fitting of the severed roof portion relative to the vehicle cab is finalized by adjustment of the latch member positions, reducing the custom grinding needed to ensure a close fit. Stiffeners are riveted or welded to the body of the cab along the back of the cab and along the B pillars of the vehicle cab to compensate for the loss of rigidity caused by severing the cab top.

Other features and improvements are disclosed.

BRIEF DESCRIPTION OF THE DRAWINGS

FIG. 5 is a section view of the front header, taken through line 5—5 shown in FIG. 1.

FIG. 6 is a frontal view of the transition seal used in the preferred embodiment.

FIG. 7 is a section view of the transition seal taken through line 7—7 in FIG. 6.

FIG. 8 is a top view of the lower cap assembly used to cap the severed rear portion of the vehicle.

FIG. 9 is a cross-sectional view taken through line 9—9 of the rear cap, illustrating the interlocking of the upper and lower cap seals.

FIG. 10 is a cross-sectional view taken through line 10—10 of FIG. 2, showing the longitudinal cross-sectional configuration of the roof cap of the preferred embodiment.

FIG. 11 is a cross-sectional view taken through line 11—11 shown in FIG. 10, illustrating the lateral crossectional configuration of the roof cap of the preferred embodiment.

FIG. 12 is a cross-sectional view taken along line 12—12 of FIG. 5 illustrating the relation of the latch mounting bracket to the removable roof section.

DETAILED DESCRIPTION OF THE INVENTION

The present invention comprises a novel method and apparatus and method for converting a hardtop vehicle to a removable top vehicle. The following description of the invention is provided to enable any persons skilled in the art to make and use the present invention and sets forth the best modes contemplated to carry out the invention. Various modifications to the preferred embodiment, however, will be readily apparent to those skilled in the art, and the generic principles defined herein may be applied to other embodiments. Thus, the present invention is not intended to be limited to the embodiment shown, but is to be accorded the widest scope consistent with the principles and novel features disclosed herein.

Figure 1:
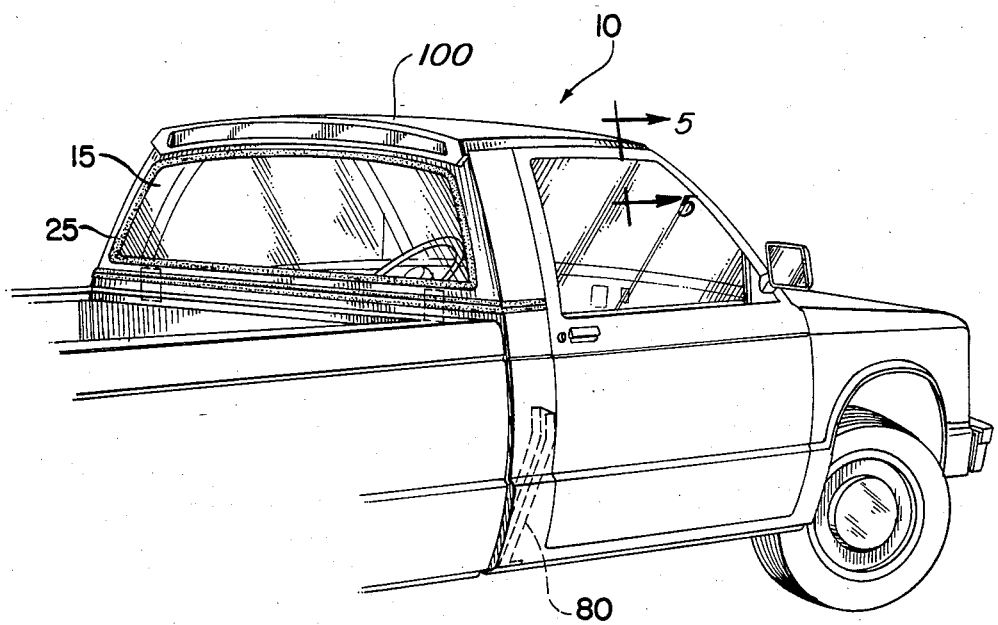
FIG. 1 is a perspective view of a hardtop pick-up truck which has been converted to a removable top vehicle in accordance with the present invention.

Referring now to FIG. 1, a perspective view is shown of the cab section and front end of a pickup vehicle 10. The particular model illustrated is a Model "S10" pickup truck manufactured by the Chevrolet Division of General Motors Corporation. It should be understood, however, that the present invention is not limited to this particular model or even this particular type of vehicle. This model does has a substantially single-walled roof typical of newer generation vehicles which are designed to reduce weight. The present invention is particularly suited to this single layer roof construction. Vehicle 10 has been modified in accordance with the present invention from a hardtop vehicle to a removable top vehicle, as is shown in the exploded view of FIG. 2. In this view, top 100 is shown lifted away from the body 200 of the vehicle.

Figure 2:
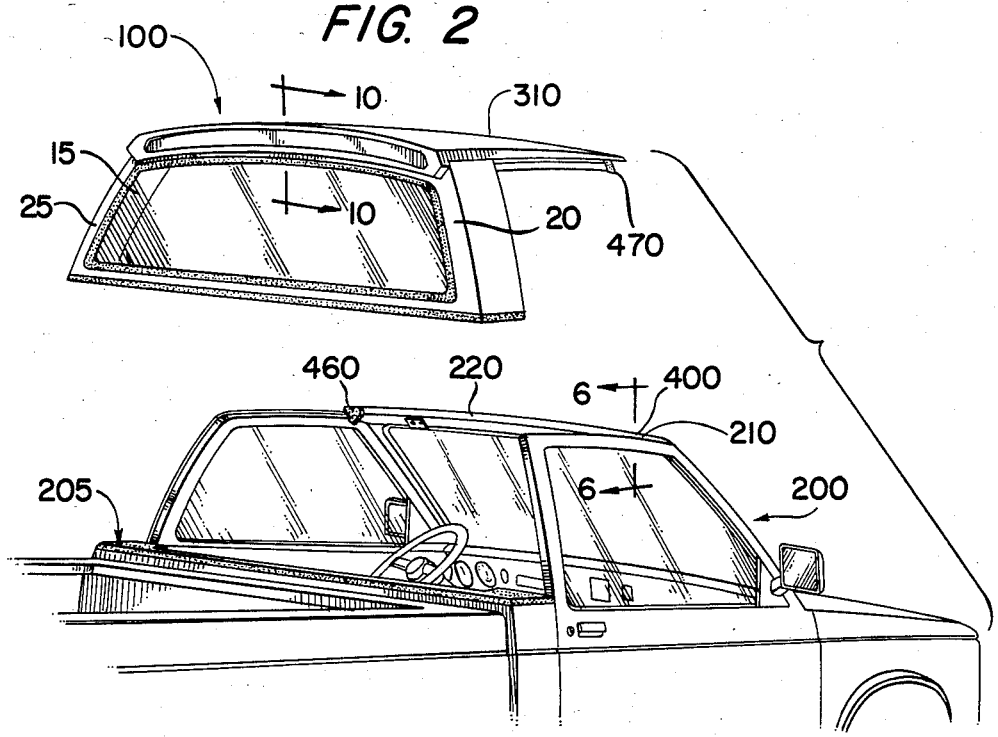
FIG. 2 is an exploded perspective view of the vehicle shown in FIG. 1, showing the removability of the vehicle top.

The initial step in the conversion process comprises the severing of the vehicle cab along lines designated generally as lines 205 and 210 (FIG. 2). Templates adapted to the particular vehicle model may be used to locate and mark the cutting lines. A conventional cutting means, such as a power saw, may be used to sever the sheet metal portions of the vehicle cab. The door seals and headliner are also severed along these lines.

The vehicle roof 100 may then be lifted away to expose the severed edges of sheet metal, headliner and door seals.

The vehicle header is designated generally by reference numeral 220 and comprises that portion of the vehicle roof extending rearwardly from the upper part of the windshield 50 to the severing line 210. The vehicle header is not removable from the vehicle.

It will be readily appreciated that an important aspect of the attachment of a removable top to a vehicle is that the roof be watertight both as to standing water and water under dynamic pressure when the vehicle is in motion. FIG. 5 illustrates the novel manner by which the present invention achieves the secure and watertight attachment of the front of the removable top 100 to the header 220 of the vehicle. In FIG. 5, reference numeral 120 indicates the original outer wall of the vehicle header 220, and reference numeral 130 indicates the sheet metal roof layer of the original vehicle. Reference numeral 125 indicates a second or inner wall of the header, which extends only approximately to the line 210 along which the vehicle cab was severed. This construction may, of course, vary from vehicle model to vehicle model.

Roof cap 310 is fitted to the removed vehicle top as illustrated in FIGS. 1 and 5, and comprises a substantially planar member formed of a thermoplastic material. Roof cap 310 is shown in more detail in FIGS. 10 and 11. FIG. 10 comprises a cross-sectional view of the roof cap member taken along longitudinal line 10—10 shown in FIG. 2. Cap 310 includes cantilevered forward portion 340 and squared-off rear portion 335, adapted to fit over the rear corner defined by the rear wall of the vehicle cab and the roof. Solid region 313 provides a mounting area to mount the roof latches and roof stiffener. Running from the rear of solid region 313 to the rear portion 335 of the roof cap are three longitudinal rib members 320, 322 and 324 (FIG. 11). These longitudinal rib members provide structural support and extend downwardly to fit against the original roof layer 130 of the vehicle.

Lateral ribs 315, 317 and 318 extend laterally between the longitudinal ribs and provide further stiffening to the roof cap 310. Lateral ribs 315, 317 and 318 are sized so that they do not normally extend to the upper surface of the original roof 130, but rather a small space is defined between bottoms of rib members 315, 317 and 318, and roof 130, to allow slight deformations of the cap member 310 without causing corresponding deformations in the roof member 130, for example, as the vehicle is in motion and encountering varying air pressure on the roof.

Immediately forward of solid region 313 is a relieved channel 350 in cap 310, running laterally across the roof cap adjacent leading edge 131 of the original roof 130 of the vehicle. During installation, channel 350 accommodates any deformations or "canning" of the sheet metal edge which occurred as a result of the cutting operation. Thus, the installer need not remove burrs from the sheet metal edge, further simplifying the installation. Channel 350 will be filled with sealant during installation. An extending rib 311 of cap member 310 extends along the channel 350 and is adapted as a registration member to fit adjacent the severed edge 131 of original roof 130.

Roof cap 310 includes a forward region 340 which is cnatilevered over header 220 of the vehicle when the removable roof is latched in position on the vehicle.

Cantilevered forward portion 340 includes a leading edge 341 which is urged against the vehicle top when the top is latched in position, so as to inhibit the entrance of moisture and air as the vehicle is in motion.

Referring now to FIG. 11, roof cap 310 includes the lateral side members 330, 332 which contact the sides of roof surface 130. Roof cap 310 transitions from the smooth gently curved top surface to side members 330, 332, which contact the edges of original roof surface 130. At the side edges, surface 130 transitions to the formed sheet metal arrangements 160, 162 at the top sides of the roof as illustrated in FIG. 11. This arrangement of surface 130 will, of course, vary from vehicle model to vehicle model.

Referring now to FIG. 5, a detail is shown of the structure at the vehicle header 220 and at the leading edge 131 of the removable roof member. It should be noted that, in the preferred embodiment, the cutting operation results in approximately 0.350 inches of roof sheet metal being removed to form the leading edge 131 of the removable roof section and the rear edge 121 of the roof header 220. Sheet metal member 125 is an inner wall or support member which is original to the particular vehicle model to which the preferred embodiment is described. Shown in cross-section in FIG. 5, structural member 125 is not uniform laterally across the roof header 220, but is formed to accommodate the curvature of the roof and provide additional support of the sides of the header. No cutting of member 125 is required inasmuch as structural member 125 ends at approximately the rear edge 121 of upper surface 120 as is shown in FIG. 5. The cross-section configuration of member 125 and header surface 120 at the side edges of header 220 match the channel labyrinth of seal 400, shown in FIG. 6 and described in more detail below.

The roof cap 310 is secured to the removable roof section 100. For the pick-up truck embodiment, roof section 100 includes not only the roof top but rear cab window 15 and side pillars 20 and 25. Of course, for other vehicle types the actual configuration of the removable top portion may vary.

Once the removable top section 100 has been severed and removed from the vehicle, the roof cap 310 is attached to the roof section 100. In the preferred embodiment, roof stiffener 132 also acts as a securing means to secure the leading edge of roof surface 130 to cap 310. Referring now to FIG. 5, roof surface 130 is sandwiched between section 313 of cap 310 and stiffener 132. Conventional fasteners 150 are used to secure stiffener 132, roof surface 130 and section 313 of cap 310 together. Other fasteners (not shown) secure roof layer 130 to cap 310 at various other points, e.g., at the intersection of lateral and longitudinal ribs of cap 310 and at the rear portion of cap 310.

Stiffener 132 comprises an elongated compound bracket formed of two separate members 133 and 134. Member 134 has a cross-sectional straightened "Z" configuration, while member 133 has a cross-sectional right angle configuration.

Stiffener member 133 is appropriately spot welded to member 134 to form compound bracket or stiffener 132. A compound bracket is used in the preferred embodiment because the two members may be separately formed to the appropriate curvature required for the particular model of vehicle, and subsequently joined together to provide a very rigid brace member. This minimizes the cost of fabrication since the two members 133, 134 may simply be cut to the appropriate length for the vehicle model, formed to the appropriate shape, and welded together.

Another feature of the present invention is the header seal 135 which is adapted to be fitted over the exposed edges of header 220 indicated by reference numerals 121 and 126. In the preferred embodiment, header seal 121 comprises an EPDM extrusion which may simply be cut to the appropriate length. Seal 135 is formed with appropriate channels to receive the edges 121, 126 and thereby position the seal in place. A silicon sealant or other type of sealant may be then used to bond seal 135 in place.

Seal 135 further includes a lip member 136 which contacts the underside of forward portion 340 of cap 310. As the roof 100 is latched into position on the vehicle, lip 136 is compressed by forward portion 340 and provides further sealing against water which may enter region 342 under dynamic pressure while the vehicle is in motion.

Figure 4:
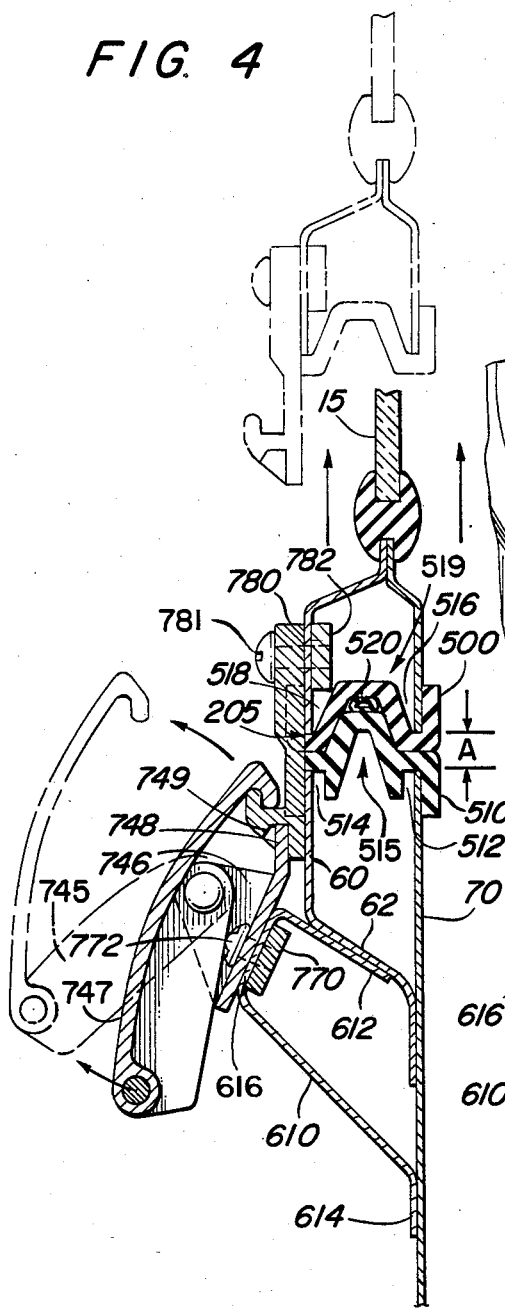
FIG. 4 comprises a section view taken through line 4—4 of line 3.
Figure 3:
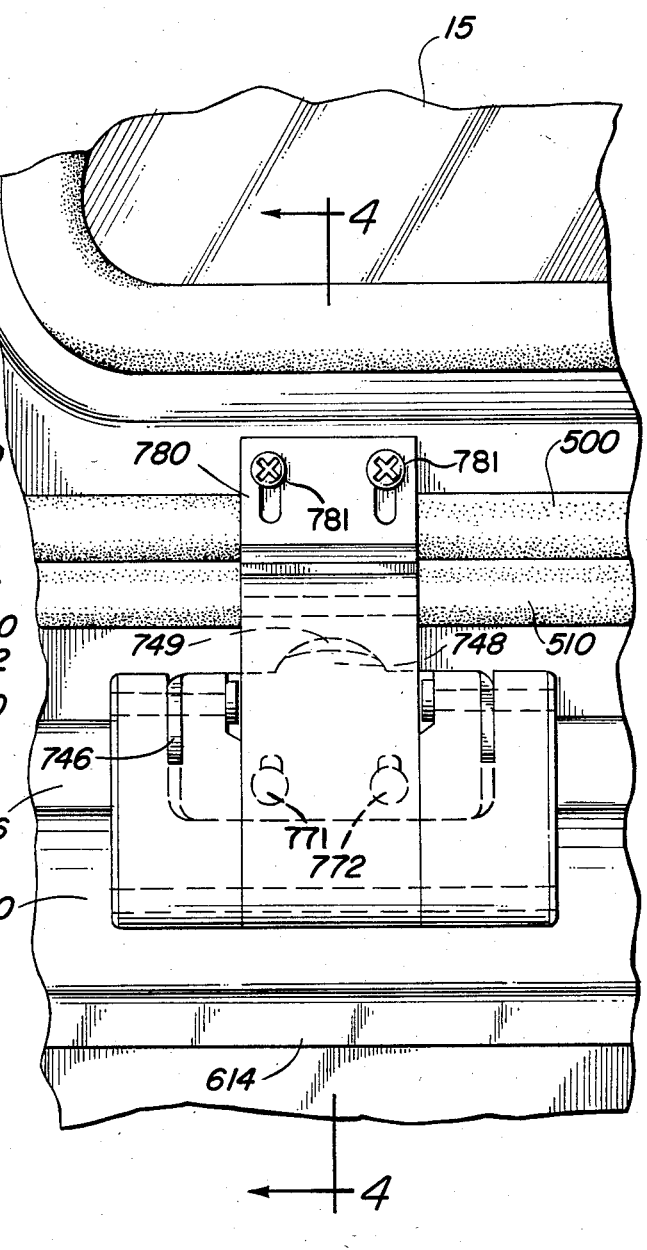
FIG. 3 comprises a frontal view of one latch mechanism affixing the rear of the removable top to the vehicle.

Another aspect of the present invention, the latch mechanisms, is disclosed in FIGS. 3, 4 and 5. Four latches are provided to secure the removable roof section in place on the vehicle. Two latches are provided to secure the leading edge of the roof section 100 to the vehicle header 220, one on each side thereof. Two additional latches are provided to secure the rear of the roof section 100 to the back of the vehicle cab, again one on each side of the rear wall of the vehicle. In the preferred embodiment the same type of latch mechanism is utilized at all four locations to reduce the number of types of parts needed to accomplish the conversion. All four latches are disposed in the interior of the vehicle cab.

Referring first to FIG. 5, one of the roof latches is illustrated in this cross-sectional view. The latch comprises an overcenter mechanism. Main latch bracket 149 is fastened to tapping plate 16, (FIG. 12) which is secured within mounting brackets 166, 168 which are fixed to compound bracket 132, e.g., by spot welding. Tapping plate 16 may have two fastener holes formed therein which are pre-bored and pre-tapped to facilitate fastening of latch bracket 149 by screws 167, 169. Bracket member 149 includes a protruding tongue member 160. Complimentary latch member 140 is secured to the header by second tapping plate 143 and fastener 147, and includes an extending hook member 162. While not visible in FIG. 5, tongue member 160 registers with a corresponding relieved area formed in bracket 140 so as to positively register the lateral position of the roof as the latch is closed.

One end of latch lever member 142 is pivotally connected to bracket 149 by pin 146. The other end of lever member 142 is pivotally attached to latch hook 144 by pin 148. Latch hook 144 has formed at its opposite end a hook-like member 164. In operation, the latch is closed by pivoting lever 142 in a clockwise direction, bringing hook-like member 164 into contact with opposing hook-like member 162 of complimentary latch member 140, and then pivoting lever member 142 in the opposite direction to close the latch in the closed position as shown in solid line in FIG. 5. This specific type of latch mechanism is old in the art, but its application to the present invention is considered novel in that the two members being latched together are not disposed in a coplanar relationship. Indeed, the roof and the header meet in an angular disposition at line 210.

Referring now to FIGS. 6 and 7 another aspect of the present invention, the transition seal pieces, is disclosed. It will be appreciated that the header seal extends only from one lateral edge of the header to the other lateral edge. Four transition seal members are used to provide a continuous sealing from the end of the header seal to the vehicle door. An exemplary one of the seals is transition seal 400 shown in FIGS. 2, 6 and 7. Seal 400 comprises a molded EPDM member, with one side having a plurality of recessed channels formed on therein. The channels are molded so as to receive the severed edges of the header (or roof section) in a press fit. Thus, as described above, the severed edges of inner wall 125 and outer wall 120 are received in the channels 410 of seal 400. The end of the header seal 135 butts against face 425 at transition member 400 to provide a continuous seal; a bonding agent may be used to seal the end of header seal 135 to face 425 of seal 400.

Protrusion 420 (best shown in FIG. 7) is provided to engage the existing door seal of the vehicle, which has been severed during the cutting process. The existing door seal comprises a compressable hollow cylindrical member formed of a resilient material. Protrusion 420 may be inserted within the hollow portion of the door seal, providing a continuing seal, and further providing another convenient location to bond the transition piece in place. As with the header seal, a silicon sealant may be used to bond the transition seal 400 in place to the edges of the sheet metal.

The transition seal 400 shown in FIG. 6 is adapted to fit to the header right-side edge, i.e., on the right-hand door frame, as shown in FIG. 2. Another transition seal 460, which is the mirror image of seal 400, is affixed to the left edge of the header adjacent the left door frame. A matching transition seal 470 is affixed to the right, front edge of the removable roof section, and is adapted with appropriate channels to receive the severed sheet metal edges of the roof section 100. Seal 470 is also formed with a protrusion which is adapted to be received within the existing severed door seal. Seal 400 has a planar face 422 which is adapted to face a corresponding planar surface of seal 470 when the roof is latched into position on the vehicle. When the roof is latched in position, the facing planar surfaces are urged into a compression fit against one another to prevent entrance of water. The material from which the transition seals is fabricated, an EPDM material, has a Shore rating of about 30, and is sufficiently resilient so as to readily accept some compression.

Referring now to FIGS. 3 and 4, the manner in which the rear side of the removed roof section 100 is affixed to the vehicle cab is illustrated. In the vehicle model used in the preferred embodiment, the rear vehicle cab wall comprises double-wall construction. Accordingly, when the vehicle is severed along line 205, the inner wall 60 and outer wall 70 are each cut along line 205, approximately 0.350 inches of material is removed, generally designated by the space A in FIG. 4. Upper cap member 500 and lower cap member 510 are respectively disposed in place to cap the open regions between walls 60 and 70 which are exposed by the severing process.

FIGS. 3, 4, 8 and 9 illustrate the structure whereby rear edges of the removable top 100 are removably joined to the vehicle cab. Upper cap 500 and lower cap 510 are adapted to cover the openings between the rear cab inner wall 60 and outer wall 70 which are formed when the vehicle top is severed. The cross-sectional configuration of the vehicle cab along cutting line 205 changes from the configuration at the rear of the vehicle cab below rear window 15 to the configuration at the vehicle B pillars 20 and 25 (FIG. 12). This transition in the cross-sectional configuration is illustrated in FIG. 8, which shows a top view of lower cap 510. Reference numeral 522 indicates the region at the rear of the vehicle; in this region the inner and outer walls are relatively close together. Reference numeral 524 indicates the region along the right vehicle B pillar; in this region the inner and outer walls are further apart. Reference numeral 526 indicates the region in which the right vehicle door edge is received when closed. The configuration of the caps 500 and 510 follows the configuration of the inner and outer walls.

Referring now to FIGS. 4 and 9, cap 510 is formed to define channels 512 and 514 adapted to receive the severed edges of walls 60 and 70 when the cap is disposed in position as shown in FIG. 4. In the region of the rear vehicle wall, cap 510 is formed with an upwardly extending protrusion or ridge 515. Cap 500 is formed with a recessed channel 519 having sloping walls, which channel is adapted to receive protrusion 515 when the removable vehicle top is disposed in position on the vehicle. This interlocking of members 515 and 519 provides a registration means to facilitate joinder of the roof 100 to the vehicle 10 and further serves to secure the rear side of roof section 100 from lateral movements relative to the vehicle.

A "D" shaped neophrene seal 520 is secured in the channel 519 to provide a further barrier to the entrance of moisture and wind. Protrusion 515, channel 519 and seal 520 are arranged to achieve a nominal separation of 1/16 inches between the flat opposing plates of caps 500 and 510 when the roof is latched in position.

FIG. 9 illustrates the cross-sectional configuration of caps 500 and 510 in the B pillar side region of the vehicle. In the region the caps are widened by the inclusion of flat plate areas 503 and 511.

The severed edges of walls 60 and 70 may be bonded to the channels of the caps 500 and 510 by a silicon sealant or the like to secure the caps in position. Before the caps are placed in position, however, a stiffener member 610 is attached to the rear wall of the vehicle cab and the rear latch members installed in the manner shown in FIG. 4. In this cross-section view, surface 612 of stiffener 610 is secured by fasteners or spot welding to the lower surface 62 of inner wall 60. Surface 614 of stiffener 610 is affixed to the inner surface of outer wall 70 of the vehicle, preferably using a fastener, since welding would burn the paint on the vehicle exterior. Stiffener 610 is appropriately formed to provide a mounting surface 616 to which latch bracket 746 may be secured. Stiffener 610 extends across the rear of the vehicle cab in the preferred embodiment, at least between the two rear latch units. The purpose of stiffener 610 is to act as a stiffener member to compensate for the loss of vehicle body rigidity caused by severing the top and to provide a mounting means for mounting latch bracket 746.

Tapping plate 770 is provided to allow a convenient method to secure a fastener such as 772. As hereinabove described, all four latches in the preferred embodiment are identical. Another tapping plate 782 and fasteners 781 are provided to secure the complimentary latch member 780. As discussed hereinabove, a tongue member 748 of bracket 746 is adapted to register with a relieved area 749 of complimentary latch member 780. Tongue member 748 and recessed area 749 are shown in phantom in FIG. 3. It will be appreciated that the foregoing arrangement results in secure attachment of the latch members while at the same time reducing the number of fastener holes formed through the outer body of the vehicle, preserving the original coating of paint.

FIG. 3 further illustrates the configuration of the latch assembly used in the preferred embodiment. Lever member 745 is wide enough to provide a substantial surface for one to exert a force to open and close the latch. Hook member 747 may be fitted over the complimentary latch member 780 and pressure applied against lever 745 to close the latch. Two latches assemblies are used, one on each side of the rear of the vehicle cab. While the particular placement of the two rear latches will depend on the particular vehicle design, in the preferred embodiment, a latch is disposed adjacent the edges of the rear vehicle wall and below the rear window 15 as shown in FIG. 3. This location is found to provide convenient access to the latches for removing or replacing top 100.

It is desirable to minimize the tolerances for the cutting operation. Another aspect of the present invention is the utilization of the latch members to provide a positioning adjustment with respect to positioning of the vehicle top relative to the vehicle. Therefore, the latch members of the present invention are secured to the vehicle and roof in a manner such as to allow them approximately 3/16th inch vertical positioning movement to each latch member. This may be accomplished by providing slotted openings in the latch brackets and complimentary latch assemblies to allow adjustment in the longitudinal positioning. Thus, the top may be positioned on the vehicle and the position of the latches may be adjusted to obtain the best possible fit. The screws which mount the latch members may then be fastened down to fasten securely the latch members in position.

An additional stiffening member 80 is secured to each B pillar of the vehicle, as shown in FIG. 1. Stiffening member 80 may be welded in position to provide further rigidity to compensate for the loss in rigidity suffered as a result of severing the roof. It is believed that the rigidity which is lost as a result of the severing of the top is more than regained by the use of stiffening members 80 and the stiffening member 610 which are added along the rear of the vehicle cab.

Having described the elements embodying the present invention, the conversion process will be now be described on a step-by-step basis. The preferred embodiment has been described in connection with a particular type of vehicle, a pick-up truck, and more particularly with the "S10" model pick-up which is manufactured by the Chevrolet Division of the General Motors Corporation. It will be appreciated that the present invention is readily adapted to other types of vehicles and other models of pick-up trucks and that the use of this pick-up truck in this description is exemplary only.

Templates will be provided to precisely mark or scribe the lines along which the cutting of the vehicle is to be accomplished. Due to the positioning available as a result of the adjustment available for the latch mechanisms, the cutting operation need not be to very close tolerances, thereby enhancing the ease of installation. Once the cutting lines have been scribed, the vehicle body will be cut by a power saw or other conventional means. The cutting operation will take place generally along lines 210 and 205. After the cutting operation the top of the vehicle may be lifted away.

The complimentary latch members 140 of the two forward latches which secure the top of the roof may be secured in position to the header by the use of tapping plates and threaded fasteners.

The header seal may then be bonded in position using a silicon sealant or other appropriate bonding agent. Next the header transition seal pieces may be bonded in location, one respectively on the left and right sides of the header. The same silicon sealant may be used to bond the transition seals in place. A molded headliner 90 covering the interior side of the header may be installed which includes appropriate recesses for the latch members 140.

Another step is the securing of the roof cap 310 to the original roof of the vehicle. Stiffener 132 will be disposed on one side of the leading edge of the severed roof line and the roof cap on the other, and screw fastener 150 will be used to fasten the sandwich in place. The roof transition seals may be bonded in place once the stiffener has been secured. The brackets 149 of the roof latches may then be secured in place, as illustrated in FIGS. 5 and 12. These fasteners will not be torqued to a tightened position, however, until the roof has been adjusted in position on the vehicle.

The original vehicle headliner 95 may then be replaced and fitted so as to cover stiffener 132. U-shaped trim piece 97 secures the edge of headliner 95 to edge 130 of roof surface 130.

Another step is to secure the stiffening braces 80 in position in the B pillars, and to fasten the stiffening braces 610 in position on the back wall of the vehicle. The latch brackets 746 and complimentary bracket 780 may then be secured in position using fasteners and tapping plates disposed on the interior side of the interior wall and stiffeners 610. Again, the fasteners will not be torqued to a tightened position until the positioning has been adjusted. The upper and lower caps 500 and 510 may then be secured in position and bonded using a silicon sealing agent. Rubber gasket member 520 may be bonded in position.

The severed roof is now ready to be lifted into position on the vehicle and the latch plates adjusted to accomodate any deviations from the nominal dimensions and to ensure proper closure and fit of the doors. Once this is done the latch plates may be tightened to a tightened condition and the latches closed to securely mount the roof in position.

The roof cap 310 and rear caps 500 and 510 are formed of a high temperature, elastomeric urethane material in the preferred embodiment. Openings are formed at the rear of cap 310 to provide vents to relieve air pressure and allow moisture to escape between cap 310 and roof 130.

The above described apparatus and method enable the conversion of a hardtop vehicle to a removable top vehicle. The conversion is time and material efficient, minimizing cosmetic damage to the vehicle which would otherwise require repair. The novel roof cap solves the problem of conversion of a vehicle with a roof having a single wall and is aesthetically pleasing. Moreover, the aerodynamic properties of the original vehicle have been substantially preserved.

It is to be understood that the above description is merely a description of the preferred embodiment. Many modifications and changes can be made to the specific apparatus shown and the specific process disclosed without departing from the spirit and scope of this invention. It is to be understood that the present invention is not to be limited to the specific disclosure herein, but rather is intended to be limited only by the scope of the appended claims.

We claim:

1. In a vehicle having a removable hardtop which is removable along a front line defining a header and along a rear line, the improvement comprising:
   roof cap means secured to and adapted to fit over at least a portion of said removable hardtop and to cover the front line;
   elongated header seal means disposed along such header, said roof cap means and said header seal means cooperatively arranged for mutual sealing of a region adjacent said front line;
   first and second cap members, said first cap member arranged to cover the edge of walls of said vehicle in a region adjacent said rear line; and
   latch members arranged to latch said removable hardtop to said vehicle when disposed in position on said vehicle.

2. The improvement of claim 1 wherein said roof cap means includes a cantilevered forward portion adapted to extend over said header when said hardtop is latched in position on said vehicle.

3. The improvement of claim 2 wherein said cantilevered forward portion includes a leading edge and said roof cap means is adapted so that the lower surface of the leading edge of said forward portion is urged against a surface of the vehicle when said hardtop is latched in position.

4. The improvement of claim 1 wherein said hardtop includes an outer wall surface, and further comprising roof stiffener means disposed along a leading edge of said removable hardtop, and said roof cap means and said stiffener means are adapted such that said outer wall is sandwiched between said stiffener and cap means.

5. The improvement of claim 4 wherein said roof stiffener means comprises elongated bracket means adapted to be secured along said leading edge of said removable hardtop.

6. The improvement of claim 5 wherein said elongated bracket means comprises a compound bracket member formed of a first elongated member and a second elongated member.

7. The improvement of claim 1 further comprising transition seal means for sealing the side edges of the joinder of said header and said hardtop when said hardtop is latched in position on said vehicle.

8. The improvement of claim 7 wherein said transition seal means comprises left and right pairs of first and second edge seal members, wherein said first members are adapted to fit one each along a side corner of said header member of said vehicle and said second edge seal members are adapted to fit one each along a front side edge of said removable hardtop.

9. The improvement of claim 8 wherein said first and second edge seals are cooperatively formed with facing surfaces which are urged against one another when said removable roof is latched into position on said vehicle.

10. The improvement of claim 9 wherein said facing surfaces of said edge seals comprise planar surfaces which are urged into tightly abutting relationship when said roof is latched into position of said vehicle.

11. The improvement of claim 8 wherein said first edge seal members include relieved channel areas adapted to receive sheet metal edges of said vehicle header edge.

12. The improvement of claim 11 wherein said first edge seal members are adapted to matingly engage portions of the vehicle door seal at said side edge.

13. Apparatus for the conversion of hardtop vehicles to removable hardtop vehicles, wherein the hardtop may be fixed in position or removed from the vehicle and at least a portion of said hardtop is defined by a single wall structural element, and said hardtop is severed from said vehicle at front and rear joints, comprising:
   joinder means adapted to seal surfaces of said vehicle which mate together when said removable hardtop is fixed in position on said vehicle;
   roof cap means adapted to fit over at least a portion of said single wall structural element and said front joint and adapter to cooperate with said joinder means to mutually seal said front joint; and
   securing means for removably securing said removable hardtop to said vehicle.

14. The apparatus of claim 13 wherein said roof cap means includes an extending forward portion adapted to cover a portion of said vehicle which is not removable, when said hardtop is positioned on said vehicle.

15. The apparatus of claim 14 wherein said forward portion includes a leading edge and said forward portion cantilevers over a non-removable header area of said vehicle, and said leading edge is urged into substantial contact with a portion of said header area when said hardtop is secured in position.

16. The apparatus of claim 13 further including stiffening means adapted to secure a leading edge of said single wall to said roof cap means.

17. The apparatus of claim 15 wherein said joinder means includes elongated seal means adapted to seal the joinder of said header area and said forward portion of said roof cap means when said removable hardtop is secured to said vehicle.

18. The apparatus of claim 17 wherein said elongated seal means is secured to said header area.

19. The apparatus of claim 17 wherein said joinder means includes transition seal members adapted to seal corners at which said leading edge and said header area are joined.

20. The apparatus of claim 19 wherein said transition seal members comprises first, second, third and fourth transition seal members, said first and second members comprising a left seal pair of said third and fourth members comprising a right seal pair.

21. The apparatus of claim 20 wherein said first and third members are disposed on the left and right sides, respectively, of the vehicle header and are adapted to cooperatively engage portions of the vehicle door seal.

22. The apparatus of claim 13 wherein said securing means comprises a pair of front latch units, said front latch units arranged to secure the leading edge of said hardtop against said header area of said vehicle.

23. The apparatus of claim 22 wherein said front latch units include position registration means for registering the lateral position of said hardtop relative to said vehicle.

24. The apparatus of claim 23 wherein said latch units comprise over-center latch mechanisms.

25. The apparatus of claim 13 wherein said joinder means includes upper and lower cap means, said upper cap means arranged to cover rear edges of said hardtop and said lower cap means arranged to cover edges of a rear portion of said vehicle, and said upper and lower cap members are adapted to interlockingly engage when said hardtop is in position on said vehicle.

26. The apparatus of claim 25 wherein said upper and lower cap means further comprise position registration means for registering a first lateral position of the hardtop relative to said vehicle during installation.

27. The apparatus of claim 25 wherein said securing means includes a pair of rear latch units arranged to secure the rear edge of said hardtop to a portion of said vehicle.

28. The apparatus of claim 27 wherein said rear latch units include position registration means for registering a second lateral position of said hardtop relative to said vehicle.

29. The apparatus of claim 13 wherein said securing means includes position adjustment means adapted to allow adjustment of the position of the hardtop relative to said vehicle.

30. The apparatus of claim 13 further comprising rear stiffener bracket means for stiffening a rear portion of said vehicle.

31. The apparatus of claim 30 wherein said securing means includes rear latch members, and said rear stiffener bracket means are further adapted to provide structural support to said rear latch units.

32. The apparatus of claim 13 further comprising stiffener bracket members for attachment within side pillars of said vehicle.

33. Apparatus for the conversion of hardtop vehicles to removable top vehicles, wherein a portion of said hardtop is severed from vehicle, thereby defining a vehicle header and a top leading edge, comprising:

roof cap means arranged to substantially cover at least part of said severed portion;

joinder means for removable joinder of severed edges of said severed portion and said vehicle, said joinder means comprising (i) elongated header seal means, said roof cap means and said header seal means cooperatively arranged for mutual sealing of said leading edge and said header, and (ii) left and right pairs of transition seal members adapted to seal the juncture of left and right corners of said header and said leading edge; and securing means for removably securing said severed portion to said vehicle.

34. The apparatus of claim 33 wherein said roof cap means includes a cantilevered forward portion adapted to substantially cover the juncture of said header and said leading edge when said severed portion is secured in position.

35. The apparatus of claim 34 wherein said cantilevered forward portion includes a leading edge which is urged into substantial contact with said header when said severed portion is secured in position on said vehicle.

36. The apparatus of claim 35 wherein said securing means comprises latching means adapted to secure said leading edge of said severed portion into abutting relationship with said header.

37. The apparatus of claim 36 wherein said latching means include a latch position adjustment means adapted to allow positioning of said severed portion relative to said vehicle.

* * * * *